US007515102B2

United States Patent
Monnerat

(10) Patent No.: US 7,515,102 B2
(45) Date of Patent: Apr. 7, 2009

(54) GPS.WIFI TERMINAL

(75) Inventor: Michel Monnerat, L'Union (FR)

(73) Assignee: Alcatel, Paris (FR)

( * ) Notice: Subject to any disclaimer, the term of this patent is extended or adjusted under 35 U.S.C. 154(b) by 179 days.

(21) Appl. No.: 11/296,324

(22) Filed: Dec. 8, 2005

(65) Prior Publication Data
US 2006/0139208 A1 Jun. 29, 2006

(30) Foreign Application Priority Data
Dec. 28, 2004 (EP) ................................. 04293152

(51) Int. Cl.
*G01S 1/00* (2006.01)
(52) U.S. Cl. .................................................. 342/357.1
(58) Field of Classification Search .................
342/357.01–357.17, 456
See application file for complete search history.

(56) References Cited
U.S. PATENT DOCUMENTS
6,111,540 A 8/2000 Krasner
6,400,314 B1 * 6/2002 Krasner ................ 342/357.09

| | | | |
|---|---|---|---|
| 7,295,517 B2 * | 11/2007 | Anim-Appiah et al. | ..... 370/232 |
| 2004/0087270 A1 * | 5/2004 | Krasner | ..... 455/12.1 |
| 2004/0193372 A1 * | 9/2004 | MacNeille et al. | ..... 701/213 |

FOREIGN PATENT DOCUMENTS

| FR | 2 806 580 | 9/2001 |
|---|---|---|
| GB | 2 370 476 A | 6/2002 |
| WO | WO 99/26370 | 5/1999 |

* cited by examiner

*Primary Examiner*—Thomas H Tarcza
*Assistant Examiner*—Nga X Nguyen
(74) *Attorney, Agent, or Firm*—Sughrue Mion, PLLC

(57) ABSTRACT

A terminal, in particular a mobile terminal, comprises means for processing a positioning signal coming from a satellite positioning system, means for computing direct and inverse Fourier transforms, wireless communication means using OFDM modulation, and priority management means for assigning resources of the direct/inverse Fourier transform computation means either to the positioning signal processing means or to the wireless communication means.

12 Claims, 2 Drawing Sheets

GPS.WIFI TERMINAL

CROSS-REFERENCE TO RELATED APPLICATIONS

This application is based on French Patent Application No. 04293152.7 filed Dec. 28, 2004, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a method aimed at optimizing the architecture of a mobile terminal supporting a location function based on receiving signals from a global navigation satellite system (GNSS) and wireless communication using orthogonal frequency diversity multiplexing (OFDM), such as a WiFi™ function conforming to the 802.11a or 802.11g standard or supporting a WiFi™ function by means of a dual-band chip conforming to a standard that is not compatible with OFDM coding and also to a standard that is compatible therewith.

2. Description of the Prior Art

In a satellite positioning system using radio navigation satellite system (RNSS) terminals such as a Global Positioning System (GPS) or GLONASS terminal, the data signals for calculating the position of the terminal come from different satellites (at least four satellites in order to determine four unknowns x, y, z and t).

The GPS signal broadcast by each satellite is based on a spread spectrum technique. The signal is therefore a binary data signal modulated by a signal whose spectrum has been spread by a code division multiple access (CDMA) method. In other words, each bit of the data signal is replaced by a spreading sequence specific to each satellite. The data is transmitted serially at 50 bit/s (equivalent to 0.02 s/bit). A spreading sequence such as a Gold pseudorandom sequence is transmitted at a much higher rate; a Gold sequence can be considered as a series of bits with a clearly defined clock period; the term "code moment" (or the more frequently used term "chip") refers to a bit of the sequence and, by extension, to the duration of this kind of bit. The spreading sequence is transmitted at a rate of 1.023 Mchip/s (a chip therefore has a duration of approximately 1 µs) and comprises 1023 chips (having a duration of 1 ms); there are therefore 20 sequence repetitions per data bit.

Modulation by the signal whose spectrum has been spread means that a "normal" demodulator will interpret the received signal as noise.

To separate the signals coming from different satellites, the terminal correlates the signal received and a local replica of the spreading code corresponding to the satellite whereof the information content is to be extracted.

Generally speaking, the correlation function $f(\tau)$ of two signals $f_i(t)$ and $f_j(t)$ is given by the equation:

$$f(\tau) = \int_{+\infty}^{-\infty} f_i(t) \cdot f_j(t - \tau) \cdot dt$$

in which $\tau$ designates a variable time. Of course, in practice, the integration is not performed from $-\infty$ to $+\infty$, but over a finite time period, dividing the integral by the duration of said period. If the functions $f_i(t)$ and $f_j(t)$ are identical, the term autocorrelation function is used; if the functions $f_i(t)$ and $f_j(t)$ are different, the term intercorrelation function is used.

Each satellite k has its own pseudorandom signal $c_k(t)$. Each of these pseudorandom signals has the property that its autocorrelation function is a null function except in the vicinity of the null time shift, where it assumes a triangular shape. In other words, the integral $$\int_{+\infty}^{-\infty} c_k(t) \cdot c_k(t - \tau) \cdot dt$$

has a null value when $\tau$ has a non-null value and is at a maximum when $\tau$ has a null value.

Furthermore, the signals each associated with a different satellite are selected so that they have a null intercorrelation function; in other words, the integral $$\int_{+\infty}^{-\infty} c_k(t) \cdot c'_k(t - \tau) \cdot dt$$

has a null value when $\tau$ has any value if k and k' are different.

The signals from the satellites whose spectra have been spread are therefore chosen to be orthogonal.

When the terminal is seeking to acquire data from a particular satellite, it correlates the signal received with a replica of the pseudorandom sequence of the satellite concerned (this sequence is assigned to the satellite once and for all and does not change during the lifetime of the satellite).

Accordingly, the signal $S(t)$ received by the terminal is the sum of all of the signals transmitted by each satellite:

$$S(t) = \sum_{k=1}^{n} c_k(t) \cdot d_k(t),$$

where n is the number of satellites, $c_k(t)$ represents the spread spectrum signal from the satellite k and $d_k(t)$ represents the data from the satellite k.

To acquire the data from the satellite m, the local replica corresponds to the signal $c_m(t)$. Accordingly, following correlation, and assuming that the spreading signals are perfectly orthogonal, all the data from the satellites that are not being looked for (the intercorrelation functions whereof have a null value) are eliminated, leaving only the data from the satellite m. Correlation is possible because the duration of a spreading sequence is twenty times smaller than the duration of a data bit.

The signal acquisition phase consists in calculating the correlation of the signal received with the local replica of the required satellite code over a time period equivalent to the period of the code, which is 1 ms, with a depth (integral limit) depending on the detection performance required.

However, implementing this kind of solution gives rise to certain difficulties, in particular in terms of calculation complexity.

The most widely used and effective technique for reducing the computation load computes the correlation function using fast Fourier transforms. The computation steps are then as follows:

compute the Fourier transform of the incoming signal on a given time support, compute the fast Fourier transform of the local replica of the spreading code corresponding to the satellites whose information is to be extracted, multiply the resulting two vectors, compute the inverse fast Fourier transform of the product.

Although this computation method achieves a significant improvement in terms of computation complexity, it is nevertheless very costly to implement in terminals with limited capacity in terms of computation power and power consumption. This is precisely the situation in a mobile terminal such as a mobile telephone.

Also, communication techniques based on OFDM modulation techniques are expanding at an increasing rate. For example, the 802.11a and 802.11g WiFi™ techniques are based on OFDM modulation.

The OFDM modulation technique is based on a technique of optimum frequency diversity obtained by fast Fourier transform computation on the modulating signal. Details of this technique can be found in the thesis "The suitability of OFDM as a modulation technique for wireless telecommunications, with a CDMA comparison", Eric Lawrey, October 1997. This modulation technique employs a large number of fast Fourier transform calculations. To this end, mobile communication terminal manufacturers are developing dedicated computation devices, thereby increasing the complexity of the architecture of these mobile terminals and their power consumption.

The invention starts with the astute observation that GNSS and OFDM computation techniques are very similar, the invention therefore consists in judiciously pooling resources to optimize the architecture of mobile terminals supporting a satellite location function and a wireless communication function based on OFDM modulation.

SUMMARY OF THE INVENTION

To this end, the invention consists in a terminal, in particular a mobile terminal, comprising means for processing a positioning signal coming from a satellite positioning system, means for computing direct and inverse Fourier transforms adapted to cooperate to compute the position of the terminal, wireless communication means using OFDM modulation, and priority management means for assigning resources of the direct/inverse Fourier transform computation means either to the positioning signal processing means or to the wireless communication means.

In one embodiment, the positioning signals being divided into blocks, said priority management means include an algorithm comprising the following steps:

detection of whether the direct/inverse Fourier transform computation means are being used by the wireless communication means, if said computation means are being used by said wireless communication means, a request for use of the resources of said computation means by said positioning signal processing means is put on hold until at least said wireless communication means have finished using said resources of said computation means, if said computation means are not being used by said wireless communication means, then said request for use of said resources of said computation means by said positioning signal processing means is granted at least for processing over the duration of one block.

In one embodiment said algorithm further comprises the following step:

if said computation means are being used by said positioning signal processing means, then said request for use of said resources of said computation means by said wireless communication means is put on hold until at least said wireless communication means have finished using said resources of said computation means over the duration of the current block, said resources of said computation means being assigned with the highest priority to said wireless communication means at the end of said positioning processing for said current block.

In one embodiment said wireless communication using OFDM modulation either conforms to the 802.11a or 802.11g WiFi™ standard or is effected by means of a dual-band chip conforming to a standard that is not compatible with OFDM modulation and to a standard that is compatible therewith.

The invention also consists in a method of optimizing the resources of direct and inverse Fourier transform computation means of a terminal, in particular a mobile terminal, comprising means for processing a positioning signal coming from a satellite positioning system, said computation means being adapted to cooperate to compute the position of said terminal, which further includes wireless communication means using OFDM modulation, said method comprising a priority management step for assigning resources of said direct/inverse Fourier transform computation means either to said positioning signal processing means or to said wireless communication means.

In one embodiment, the positioning signals being divided into blocks, said method includes the following steps:

detection of whether the direct/inverse Fourier transform computation means are being used by the wireless communication means, if said computation means are being used by said wireless communication means, a request for use of the resources of said computation means by said positioning signal processing means is put on hold until at least said wireless communication means have finished using said resources of said computation means, if said computation means are not being used by said wireless communication means, then said request for use of said resources of said computation means by said positioning signal processing means is granted at least for processing over the duration of one block.

In one embodiment, if the computation means are being used by said positioning signal processing means, then said request for use of said resources of said computation means by said wireless communication means is put on hold until at least said wireless communication means have finished using said resources of said computation means over the duration of the current block, said resources of said computation means being assigned with the highest priority to said wireless communication means at the end of said positioning processing for said current block.

In one embodiment, said wireless communication using OFDM modulation either conforms to the 802.11a or 802.11g WiFi™ standard or is effected by means of a dual-band chip conforming to a standard that is not compatible with OFDM modulation and to a standard that is compatible therewith.

Other features and advantages of the invention will become apparent on reading the following detailed description and examining the appended drawings.

The appended drawings constitute part of the description of the invention as well as contributing to the definition of the invention, if necessary.

DETAILED DESCRIPTION OF THE PREFERRED EMBODIMENTS

Figure 1:
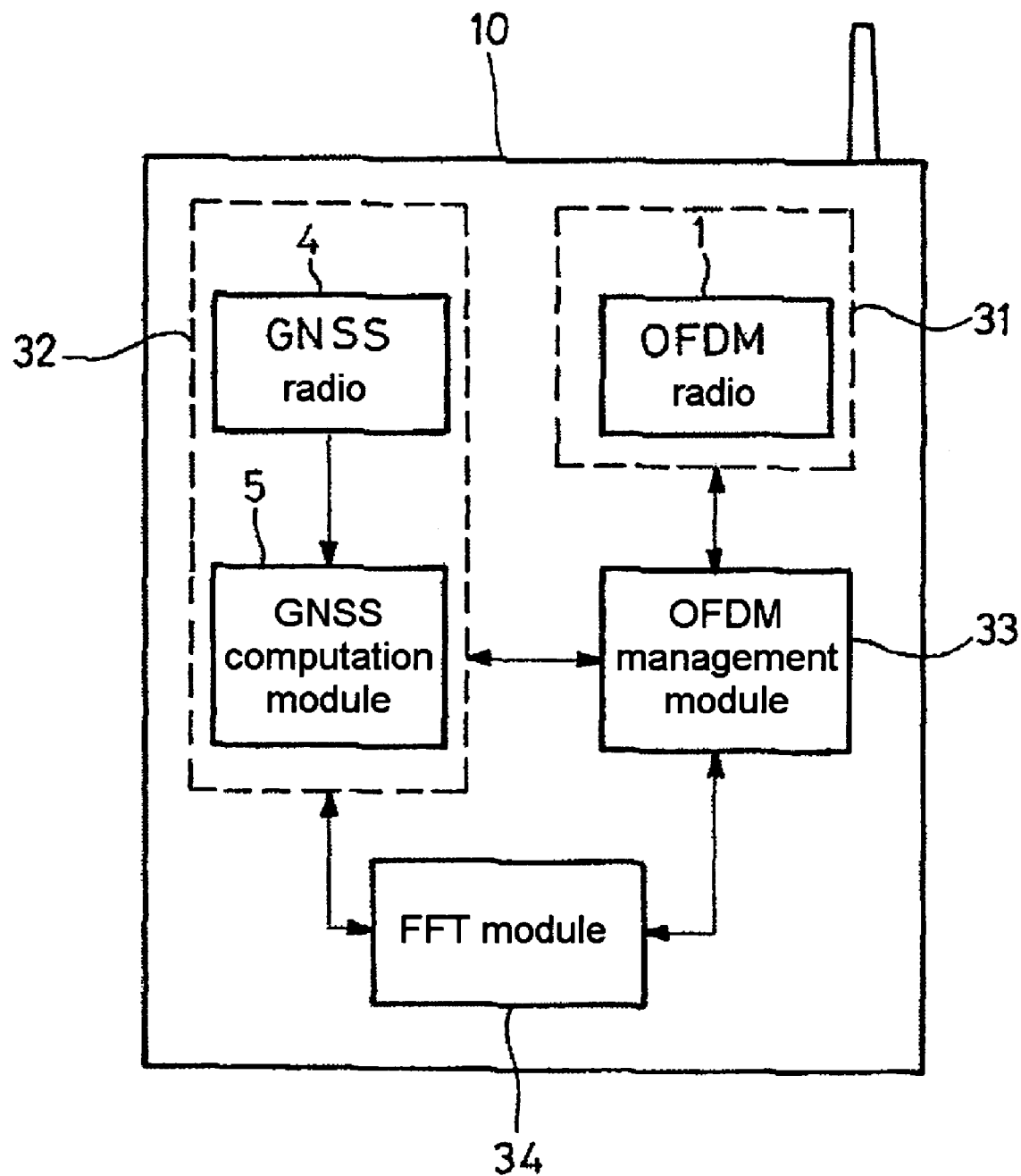
FIG. 1 is a diagram of one embodiment of the architecture proposed in the context of the present invention.

Referring to FIG. 1, the mobile telephone 10 includes a positioning module 32 using a GNSS satellite positioning system and an 802.11a or 802.11g WiFi™ communication module 31 using OFDM modulation.

The WiFi™ module employs a radio module 1 to place data to be sent on a carrier and to send the communication signal. This radio module 1 also receives signals, transposes them to the base band and forwards them to a management module 33 described in detail hereinafter.

The WiFi™ module also employs an FFT/FFT$^{-1}$ computation module 34 to generate the sub-carrier modulation and to generate the received bitstream from the modulated signal. The telephone 10 further includes, in the module 32, a positioning radio module 4, in particular for receiving satellite signals and transposing them into the base band and digitizing them (functional block referenced 6 hereinafter).

A GNSS computation module 5 manages the signals received by the positioning module 4 and positioning computation. This computation module 5 uses the FFT/FFT$^{-1}$ computation module 34 to compute the correlations between the signals received by the positioning module 34 and the code of the required satellite.

In one embodiment, management of the priorities of the fast Fourier transform computation module 34 is characterized in that:
- the module 34 gives priority to tasks linked to the WiFi™ wireless communication function, and
- the module performs the processing linked to positioning when it is not activated by the WiFi™ communication function.

Figure 2:
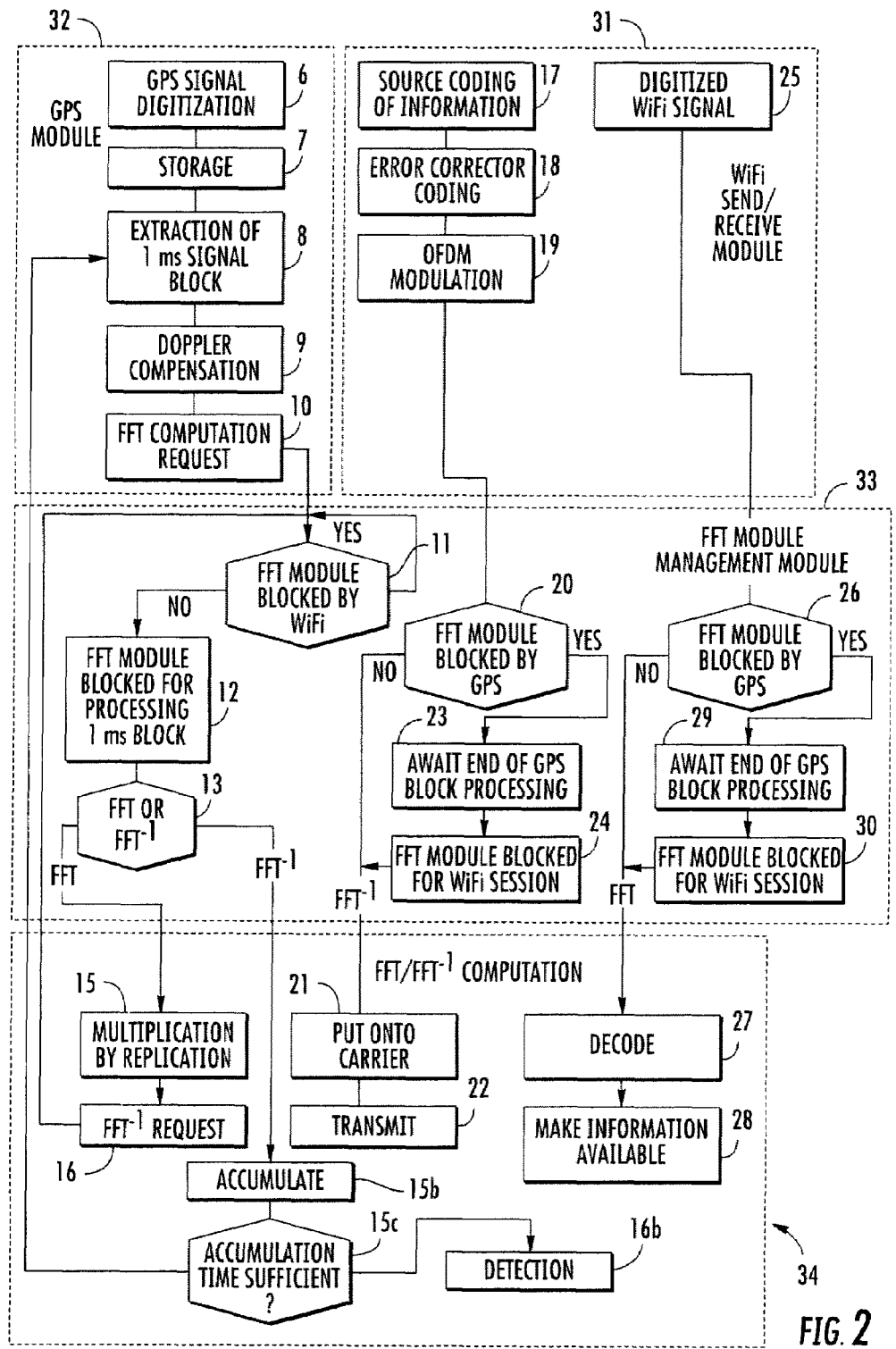
FIG. 2 shows one embodiment of a priority management method of assigning resources of direct/inverse Fourier transform computation means to means for receiving a positioning signal and to wireless communication means using OFDM modulation.

An embodiment of the invention shown in FIG. 2 is described in detail hereinafter.

In the FIG. 2 embodiment, the modular architecture of the telephone 10 includes the following elements:
- a GPS signal reception and processing module 32,
- a WiFi™ signal send/receive module 31,
- a direct and reverse fast Fourier transform computation module 34, and
- a module 33 for managing the priorities of the Fourier transformation computation module.

The processing of the GPS satellite positioning signal (hereinafter called the GPS signal) is characterized by the following steps:
- digitization of the GPS signal in step 6: the signal coming from a GPS antenna, not described, and then converted to an intermediate frequency is digitized by means of an analog/digital converter, also not described,
- storage in step 7: the signal is then transposed into the base band and then stored in RAM in the terminal 10,
- extracting a 1 ms block in step 8: the GPS signal is structured in 1 ms blocks corresponding to the period of the spreading codes (see above), so that processing lends itself to processing by 1 ms blocks,
- Doppler compensation in step 9: to extract a particular satellite it is possible, although not necessary, to correct the Doppler effect affecting the target satellite signal by complex multiplication of the signal by a phase ramp corresponding to the predicted Doppler frequency affecting the required satellite,
- direct FFT request in step 10: as indicated above, the standard processing of the GPS signals consists in computing a correlation of the incoming signal with a local replica of the spreading code of the satellite whose information is to be extracted; here it is proposed to effect the correlation through an FFT computation using the principle of equivalence well known to the person skilled in the art:

$$f \otimes g = FT^{-1}[TF(f)*\text{conj}(FT(g))]$$

in which f and g are two functions and FT denotes the Fourier transform.

An FFT computation is requested for this operation in step 10:
- this request is sent to the management module 33 of the FFT/FFT$^{-1}$ module,
- the operation of step 11 aims to detect if the module 34 is being used by the WiFi™ communication function 31; if it is, then the request is put on hold; if not, the module 34 is reserved by the function 12 for the processing of the current 1 ms block,
- a function 13 orients the computation to a direct or inverse fast Fourier transform according to the nature of the request; it is assumed that the nature of the request is stated in the request itself so that orienting the function 13 is a simple matter of comparing an input parameter,
- in the case of a direct Fourier transform request, the result of the computation performed by the module 34 is multiplied in a step 15 by a local replica of the transform of the spreading code of the required satellite,
- the result of this multiplication must then be subjected to an inverse transform computation; the request is sent by the operator 16,
- this request reaches the management module 33, where it is processed in the steps 11 and 13 described above,
- an inverse transform is then produced by the module 34,
- after this computation, the 1 ms correlation function is obtained and this result is accumulated with the preceding results of step 15b (e.g. added to the preceding results),
- if the accumulation time 15c is sufficient, then detecting the presence of a GPS signal is launched in step 16b; the detection operation is well known to the person skilled in the art and consists in detecting the presence of a correlation peak in the correlation function and deciding if that peak corresponds to energy broadcast by a satellite.

The module 31 is dedicated to WiFi™ wireless communication:
- when information is to be sent, it is first coded using a given source code in step 17; the source coding consists in transforming the information into symbols that may be transmitted,
- error corrector coding may then be applied in step 18,
- OFDM formatting is then dealt with in step 19: the first operation is to compute a Fourier transform; the request is sent to the module 33,
- the availability of the computation module 34 is tested in step 20; if the computation module 34 is not available and is being used by the module 32, then the computation for the WiFi™ wireless communication is put on hold until the computation of the FFT of the current 1 ms block 23 is completed, after which priority is assigned to WiFi™ processing by the block 24, the FFT computation is performed by the module 34 and the result is put on a carrier in step 21; this operation consists in multiplying the result by a carrier signal at the required send frequency, the signal obtained in this way is then sent in step 22 to a power amplifier followed by a send antenna.

The operation on receiving a WiFi™ signal is strictly the reciprocal of the above operation. After it has been processed by the radio subsystem, the WiFi™ signal is digitized in step 25:

the first processing operation is to demodulate the signal by frequency concentration, necessitating Fourier transform computation on the received signal, which is therefore forwarded to the module 33; step 26 consists in detecting if the module 34 is being used by the GPS module 32; if so, the same operations as described above in relation to steps 20, 23 and 24 are performed by the respective step 26, 29 and 30 (step 29: put on hold until end of processing of the current GPS block; step 30: blocking of the FFT module for the WiFi™ session), once the resources of the module 34 have been freed for WiFi™ processing the fast Fourier transform is computed; error corrector decoding is then applied in step 27, the information decoded in this way is made available for use linked to the application in step 28.

Thus the present invention proposes an advantageous architecture in which a WiFi™ communication module and a satellite network positioning module benefit with advantage from at least partial sharing and pooling of the fast Fourier transform computation resources.

There is claimed:

1. A terminal, in particular a mobile terminal, comprising:
    means for processing a positioning signal coming from a satellite positioning system,
    means for computing direct and inverse Fourier transforms adapted to cooperate to compute the position of the terminal,
    wireless communication means using OFDM modulation, and
    priority management means for assigning resources of the direct/inverse Fourier transform computation means either to the positioning signal processing means or to the wireless communication means.

2. The terminal according to claim 1, wherein the positioning signals being divided into blocks, said priority management means include an algorithm comprising the following steps:
    detection of whether the direct/inverse Fourier transform computation means are being used by the wireless communication means,
    if said computation means are being used by said wireless communication means, a request for use of the resources of said computation means by said positioning signal processing means is put on hold until at least said wireless communication means have finished using said resources of said computation means,
    if said computation means are not being used by said wireless communication means, then said request for use of said resources of said computation means by said positioning signal processing means is granted at least for processing over the duration of one block.

3. The terminal according to claim 2, wherein said algorithm further comprises the following step:
    if said computation means are being used by said positioning signal processing means, then said request for use of said resources of said computation means by said wireless communication means is put on hold until at least said positioning signal processing means have finished using said resources of said computation means over the duration of the current block, said resources of said computation means being assigned with the highest priority to said wireless communication means at the end of said positioning processing for said current block.

4. The terminal according to claim 1, wherein said wireless communication using OFDM modulation either conforms to the 802.11a or 802.11g WiFi™standard or is effected by means of a dual-band chip conforming to a standard that is not compatible with OFDM modulation and to a standard that is compatible therewith.

5. A method of optimizing the resources of direct and inverse Fourier transform computation means of a terminal, in particular a mobile terminal, comprising means for processing a positioning signal coming from a satellite positioning system, said computation means being adapted to cooperate to compute the position of said terminal, which further includes wireless communication means using OFDM modulation, said method comprising a priority management step for assigning resources of said direct/inverse Fourier transform computation means either to said positioning signal processing means or to said wireless communication means.

6. The method according to claim 5, wherein, said positioning signals being divided into blocks, said method includes the following steps:
    detection of whether the direct/inverse Fourier transform computation means are being used by the wireless communication means,
    if said computation means are being used by said wireless communication means, a request for use of the resources of said computation means by said positioning signal processing means is put on hold until at least said wireless communication means have finished using said resources of said computation means,
    if said computation means are not being used by said wireless communication means, then said request for use of said resources of said computation means by said positioning signal processing means is granted at least for processing over the duration of one block.

7. The method according to claim 6, wherein, if said computation means are being used by said positioning signal processing means, then said request for use of said resources of said computation means by said wireless communication means is put on hold until at least said position signal processing means have finished using said resources of said computation means over the duration of the current block, said resources of said computation means being assigned with the highest priority to said wireless communication means at the end of said positioning processing for said current block.

8. The terminal according to claim 5, wherein said wireless communication using OFDM modulation either conforms to the 802.11a or 802.11g WiFi™standard or is effected by means of a dual-band chip conforming to a standard that is not compatible with OFDM modulation and to a standard that is compatible therewith.

9. A communication device comprising;
    a position signal processor processing a positioning signal coming from a satellite positioning system,
    a direct and inverse Fourier transforms module adapted to cooperate to compute the position of the terminal,
    wireless communication apparatus using OFDM modulation, and priority management module for assigning resources of the direct/inverse Fourier transform module either to the positioning signal processor or to the wireless communication apparatus.

10. The communication device according to claim 9, wherein, the positioning signals being divided into blocks, said priority management module include an algorithm comprising the following steps:
- detection of whether the direct/inverse Fourier transform module is being used by the wireless communication apparatus,
- if said direct/inverse Fourier transform module is being used by said wireless communication apparatus, a request for use of the resources of said direct/inverse Fourier transform module by said position signal processor is put on hold until at least said wireless communication apparatus has finished using said resources of said direct/inverse Fourier Transform module,
- if said direct/inverse Fourier transform module is not being used by said wireless communication apparatus, then said request for use of said resources of said direct/inverse Fourier transform module is granted at least for processing over the duration of one block.

11. The communication device according to claim 10, wherein said algorithm further comprises the following step:
- if said direct/inverse Fourier transform module is being used by said position signal processor, then said request for use of said resources of said direct/inverse Fourier transform module by said wireless communication apparatus is put on hold until at least said position signal processor has finished using said resources of said direct/inverse Fourier transform module over the duration of the current block, said resources of said direct/inverse Fourier transform module being assigned with the highest priority to said wireless communication apparatus at the end of said positioning processing for said current block.

12. The communication device according to claim 9, wherein said wireless communication using OFDM modulation either conforms to the 802.11a or 802.11g WiFi™ standard or is effected by a module of a dual-band chip conforming to a standard that is not compatible with OFDM modulation and to a standard that is compatible therewith.

* * * * *